United States Patent Office 2,919,204
Patented Dec. 29, 1959

2,919,204

STRIP-RESISTANT BITUMINOUS COMPOSITIONS

Jack N. Dybalski, Chicago, Werner L. Riegler, Western Springs, Paul L. Du Brow and Elliot N. Schubert, Chicago, Ill., assignors to Armour and Company, Chicago, Ill., a corporation of Illinois No Drawing. Application September 21, 1956
Serial No. 611,375

14 Claims. (Cl. 106—269)

This invention relates to the problem of securing a satisfactory bond between bituminous compositions and the various surfaces to which they are applied in industrial operations. In one of its aspects, this invention relates to heat-stable bitumen additives which when added in small proportions materially improve the bond between bituminous compositions and the surfaces to which they are applied, whether the surfaces are acid or alkaline in nature. In another of its aspects, this invention relates to bituminous compositions including small proportions of these heat-stable additive agents.

When a bituminous substance such as asphalt in molten, cutback or emulsified form is applied to such hydrophilic surfaces as those of mineral aggregates in road building, concrete walls in water-proofing, paper in water-proofing, etc., it is difficult to secure prompt coating of the surfaces by the bituminous material. Further, it is difficult to prevent the stripping or removal of such bituminous coatings from such surfaces with time. Although prevention of stripping is the more important consideration, ease of application is frequently of material importance.

Where the surface is moist, damp or actually soaked, the problem is obviously intensified because the bitumen must not only coat the surface but it must first dislodge a tenaciously held water film. Some aggregates such as river gravels when freshly dredged come to the job saturated with water. Rainstorms occurring during construction also produce soaked surfaces and promote stripping. Sometimes the materials coated are porous and retain considerable moisture in the interstices after the outer surfaces seem reasonably dry.

In some cases it has been necessary first to dry the surface before applying the bituminous coating. Roadways laid in wet weather deteriorate rapidly in use. Where a bituminous roadway is subjected to water, as in low-lying areas or areas where water run-off is frequent or constant, it soon disintegrates with the development of holes. The aggregate used in its construction is easily broken down to individual pebbles or small clumps of pebbles under such conditions in the absence of some corrective or preventive procedure, such as drying the aggregate by heat before use.

In road construction use, bituminous compositions are employed in conjunction with various mineral materials, sometimes mineral materials like slags, but more generally of natural origin such as sand, rock, etc. It is obvious that the potentially usable aggregates include all of the various kinds of rocks native to the localities where roads are to be built. For example, limestone, dolomite, silica, rhyolite, caliche, and sedimentary, metamorphic, or igneous rock of various other kinds are regularly used in road building. Such mineral aggregates are hydrophilic in character, a fact that is generally considered to be principally responsible for the existence of the bitumen-stripping problem.

In general, road construction is administered by the Department of Highways or Public Works Departments of the various States and municipalities, and these administrative agencies, aware of the problem of stripping, have set up specifications which asphalt additives must meet or exceed before they can be adopted for use. Usually, these specifications are based upon tests employing mineral aggregates which are native to the State or municipality in which the road is being constructed. As would be expected, the testing procedures as well as the aggregates vary from place to place. However, many of the procedures now provide that the asphalt containing the additive be subjected to a high temperature for a given period of time. This is for the purpose of simulating the actual conditions under which the additive-containing asphalt is employed. That is, due to high labor costs the trend has been toward holding or storing the asphalt at high temperatures in a liquid state so it is readily available for use. If the additive chemical is adversely affected by temperature, as many of the prior art asphalt additives are, its ability to impart strip-resistant properties to the asphalt is impaired.

In the past, the practice has been to provide a number of different asphalt additives each more or less tailored to the various States' tests. To our knowledge, no one has ever provided a single type of asphalt additive which is both heat-stable and capable of providing a strip-resistant bituminous composition which can be applied to a mineral surface which is either acid or alkaline in nature.

It is, therefore, an object of the present invention to provide heat-stable bitumen additives which when added in small proportions materially improve the bond between bituminous compositions and the surfaces to which they are applied, whether the surfaces are acid or alkaline in nature.

It is a further object of the present invention to provide improved strip-resistant bituminous compositions including small proportions of these heat-stable additives.

Further and additional objects of this invention will become apparent as the specification proceeds.

In accordance with the present invention, we have provided a heat-stable anti-strip additive for bituminous compositions comprised of amine salts which are prepared by mixing between 1 and 2 molar equivalents of an organic monocarboxylic acid having between 8 and 22 carbon atoms with one molar equivalent of a particular type of diamine represented by the general formula

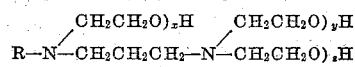

wherein R is an aliphatic hydrocarbon radical having between 8 and 22 carbon atoms and $x$, $y$, and $z$ are integers the sum of which is between 2 and 10. The basic diamines are prepared by initially reacting a long-chain primary amine with acrylonitrile followed by reduction of the nitrile group to an amine. This results in the formation of a N-aliphatic trimethylenediamine which is then condensed with from 2 to 10 moles of ethylene oxide to produce the basic diamine compound illustrated. In the preferred diamine base, $x$, $y$, and $z$ are each 1.

Examples of hydrocarbon radicals coming within the definition of R include octyl, nonyl, decyl, undecyl, dodecyl, tridecyl, tetradecyl, pentadecyl, hexadecyl, heptadecyl, octadecyl, eicosyl, docosyl, octadecenyl, octadecadienyl, octadecatrienyl, and mixtures of hydrocarbon radicals as contained in tallow, soybean oil, coconut oil, cottonseed oil, tall oil, rosin, etc. In the preferred compounds, R is a mixture of hydrocarbon radicals as contained in tallow, coconut oil or soybean oil. The preferred N-aliphatic trimethylenediamines used in forming the basic component of the salt are mixtures of diamines derived from naturally-occurring fats and oils, such as soybean oil, coconut oil, tallow, and the like. Examples of preferred diamine mixture are N-tallow trimethylene diamine (derived from tallow and in which "tallow" comprises a mixture of the following aliphatic radicals: dodecyl, tetradecyl, tetradecenyl, hexadecyl, hexadecenyl, octadecyl, octadecenyl, octadecadienyl, eicosyl, and eicosenyl); N-coco trimethylene diamine (derived from coconut oil and in which "coco" comprises a mixture of octyl, decyl, dodecyl, tetradecyl, hexadecyl, octadecyl, octadecenyl, and octadecadienyl radicals); and N-soya trimethylene diamine (derived from soybean oil and in which "soya" comprises a mixture of hexadecyl, octadecyl, octadecenyl, and octadecadienyl radicals). Hereinafter, the terms "tallow," "coco," and "soya" are meant to refer to the respective mixture of radicals set forth. Principally from an economic standpoint, R is preferably a mixture of hydrocarbon radicals as contained in tallow.

The acids which can be used in forming the amine salts of the present invention include any organic monocarboxylic acid having between 8 and 22 carbon atoms. Examples of these acids include caprylic, capric, lauric, myristic, palmitic, stearic, behenic, oleic, linoleic, linolenic, and also alicyclic monocarboxylic acids such as naphthenic acids, and abietic acid. Mixtures of fatty acids as derived from animal and vegetable oils like tallow, coconut oil, soybean oil, and the like, can be employed. However, principally from the standpoint of economics, the preferred acid is a mixture of acids derived from tall oil comprised principally of oleic and linoleic acid with a small percentage of rosin acids which are principally abietic acid. One preferred mixture of tall oil acids contains 6% rosin acids, 50% oleic acid, 40% linoleic acid and 4% linolenic acid and is sold under the trade name Neo-Fat 42–06 by Armour and Company, Chemical Division, Chicago, Illinois. Another preferred mixture contains 12% rosin acids, 46% oleic acid, 39% linoleic acid and 3% linolenic acid and is sold under thte name Neo-Fat 42–12.

In preparing our improved bitumen additives, between 1 and 2 molar equivalents of the acid are simply mixed with one molar equivalent of the particular diamine base to give a product which will vary in pH between about 6.2 and 8.7, depending upon the amount of acid employed. When one molar equivalent of acid is used the product tends to be on the alkaline side whereas when two equivalents of acid are employed, the product tends to be slightly acid.

We have discovered that in the employment of our bitumen additives, there is a general inverse relationship between the acidity or alkalinity of the mineral surface to which the bituminous composition is applied and the pH of the additive employed. Thus, for an alkaline mineral such as limestone having a pH of about 8.5, the additive which gives the best results is one which tends toward the acid side or one which contains a higher percentage of diacid salt as opposed to monoacid salt. On the other hand, when applying a bituminous composition to an acid-type of mineral such a rhyolite, an additive which tends to be on the alkaline side, that is containing more of the monoacid salt, gives a better result. In between the two extremes, we have found that there is a blend of the monoacid and diacid salts which can be employed satisfactorily for either or any type of aggregate surface. This blend is prepared by mixing between about 1.3 and about 1.6 mols of the monocarboxylic acid with 1 mol of diamine base. A preferred blend is one which is produced by mixing together about 1.4 mols of the acid with 1 mol of the diamine base. When the diamine base is N - tallow - N,N',N' - tris (hydroxyethyl) trimethylene diamine having an average molecular weight of 532 and the acid is Neo-Fat 42–06 (hereinbefore defined) having a molecular weight of approximately 288, the preferred blend will contain about 30 weight percent of the monoacid salt and about 70 weight percent of the diacid salt and have a pH of about 7.5 to 8.0.

Our improved asphalt additives can be employed either as pure materials or in the form of concentrates or solutions in a suitable organic solvent such as kerosene, naphtha, benzene, or the like, or even a cutback or penetration grade asphalt. The additives, either as the pure material or concentrate, are preferably mixed with the bitumen before it is used for coating purposes, in a concentration range, based upon the bitumen coating composition, varying between 0.05 and 2.5 weight percent. Preferably, between 0.2 and 0.85 weight percent of additive is employed.

Our improved bituminous compositions can be prepared by heating the bituminous coating material to a temperature at which its viscosity is relatively low and then mixing in the desired proportion of additive agent. Thorough mixing of the ingredients can be achieved by rolling with gas, recycling through a mixing tank with mixing-type pumps, or by stirring with a propeller or other tank-type stirrer. The bituminous mixture so prepared can be delivered to the job ready for use in any desired method of application.

This can be, for example, direct application by spraying it on already laid aggregate; application to a continuous road mixing unit; or addition to a hot-mix plant. The additive-bitumen mixture can be sprayed or poured for seal-coat application in the conventional manner. The presence of the additive does not adversely affect the useful properties of the asphalt and in fact improves its ease of application. The bituminous coating material can be handled exactly as if no reagent had been added.

Where the additive is to be incorporated in an emulsified bituminous composition, it can be added to the bitumen ingredient in the manner just described; or it can be added to the finished emulsion by simply stirring it in the desired proportion in any conventional manner.

Within the term "bitumen" we mean to include natural asphalt, petroleum still residues of paving grade, plastic residues from coal tar distillation, petroleum pitch, solutions of such substances like cutback asphalts, emulsions thereof, and the like.

In the following test results, to simplify tabulation, the additives tested have been designated by code numbers. "RD 2323" is a mixture of mono- and diacid salts formed by mixing together one mol of N-tallow-N,N',N'-tris (hydroxyethyl) trimethylene diamine with 1.425 mols of Neo-Fat 42–06, hereinbefore defined. "RD 2316" is a mixture obtained by mixing together equimolar quantities of the above reactants, and "RD2317" is a mixture obtained by mixing together one mol of N-tallow-N,N',N'-tris (hydroxyethyl) trimethylene diamine with 1.85 mols of Neo-Fat 42–06. The reactants employed in forming the mixture of mono- and diacid salts above described have been chosen as representative of their individual classes as hereinbefore defined. Variations in the reactants will not produce results outstandingly different from those hereinafter reported.

Tables I and II, which follow, demonstrate the excellent performance of RD 2323 under the conditions of the states of Massachusetts and Ohio tests. A detailed description of these tests will be found in the Appendix. The Massachusetts test was chosen primarily for its rather severe heat test, especially when working in small volumes. The Ohio test was chosen to complement the Massachusetts test by offering a different set of test conditions, as well as a different aggregate to coat.

TABLE I

*State of Massachusetts test*

[350° F. for 24 hours specified.]

| Additive | Percent Additive | Type of Asphalt | Type of Stone | Percent Initial Coating | Percent Strip 24 Hours |
|---|---|---|---|---|---|
| RD 2323 | 0.5 | RC-2 | Rhyolite | 100 | 1 |

TABLE II

*State of Ohio test*

[No heat test required.]

| Additive | Percent Additive | Type of Asphalt | Type of Stone | Percent Initial Coating | Percent Strip 24 Hours |
|---|---|---|---|---|---|
| RD 2323 | 0.5 | MC-3 | 50% Limestone / 50% Silica gravel | 100 | 1 |

While the above tests were chosen on the basis of being representative of most conditions encountered in the field, a few digressions from the rather rigid specifications were made in order that a broader concept of the potential of the additive might be obtained. The results of these tests are shown in Table III.

TABLE III

[24 hours @ 350° F.—heat test.]

| Additive | Percent Additive | Type of Asphalt | Type of Stone | Percent Initial Coating | Percent Strip 24 Hours |
|---|---|---|---|---|---|
| RD 2323 | 0.5 | MC-3 | Limestone | 100 | 2 |
| RD 2323 | 0.5 | RC-2 | do | 100 | 2 |
| RD 2323 | 0.5 | MC-3 | 50% Limestone / 50% Rhyolite | 100 | 1 |
| RD 2323 | 0.5 | RC-2 | 50% Limestone / 50% Rhyolite | 100 | 1 |
| RD 2323 | 0.5 | MC-3 | 50% Limestone / 50% Silica gravel | 100 | 1 |
| RD 2323 | 0.5 | RC-2 | 50% Limestone / 50% Silica gravel | 100 | 2 |

Based on Massachusetts heat test and combined States of Ohio and Massachusetts stripping tests.
In sealed container 0.67%[1] additive in 85–120 penetration asphalt (RC-2).
In sealed container 0.50% additive in MC-3.
Cure: RC-2—5 hours at room temperature; MC-3—5 hours at 140° F. (Above cures give maximum compression strengths.)

[1] See paragraph 1(F) of Massachusetts test procedure in Appendix for explanation of higher initial concentration when using RC-2 asphalt.

TABLE IV

[No heat test.]

| Additive | Percent Additive | Type of Asphalt | Type of Stone | Percent Initial Coating | Percent Strip 24 Hours |
|---|---|---|---|---|---|
| RD 2323 | 0.5 | MC-3 | Rhyolite | 100 | 0 |
| RD 2323 | 0.5 | RC-2 | do | 100 | 0 |
| RD 2323 | 0.5 | MC-3 | Limestone | 100 | 1 |
| RD 2323 | 0.5 | RC-2 | do | 100 | 1 |
| RD 2323 | 0.5 | MC-3 | 50% Rhyolite / 50% Limestone | 100 | 0 |
| RD 2323 | 0.5 | RC-2 | 50% Rhyolite / 50% Limestone | 100 | 1 |
| RD 2323 | 0.5 | RC-2 | 50% Limestone / 50% Silica gravel | 100 | 2 |

Based on States of Ohio and Massachusetts stripping tests.
Cure: RC-2 coated stone—5 hours @ R.T.; MC-3 coated stone—5 hours @ 140° F.
(Above cures give maximum compression strengths.)
In sealed container 0.67% additive in 85–120 penetration asphalt RC-2).
In sealed container 0.50% additive in MC-3.

RD-2323 was tested on a comparative basis against two of the best known competitive additives now available. These two competitive additives have been designated below as A and B. Additive A is an alkylamidoamine soap sold under the trade name "Super Kling." Additive B is an alkylamidoamine soap sold under the trade name "Pave." The tests chosen for these comparisons are actually composites of many State tests, and selection was based on the extent of the universal appeal of their specification.

TABLE V

*Combination Massachusetts and Ohio tests*

[24 hours @ 350° F.]

| Additive | Percent Additive | Type of Asphalt | Type of Stone | Percent Initial Coating | Percent Strip 24 Hours |
|---|---|---|---|---|---|
| RD 2323 | 0.5 | RC-2 | Rhyolite | 100 | 1 |
| Additive A | 0.5 | RC-2 | do | 100 | 5 |
| Additive B | 0.5 | RC-2 | do | 100 | 10 |
| RD 2323 | 0.5 | RC-2 | 50% Silica gravel / 50% Limestone | 100 | 2 |
| Additive A | 0.5 | RC-2 | 50% Silica gravel / 50% Limestone | 100 | 15 |
| Additive B | 0.5 | RC-2 | 50% Silica gravel / 50% Limestone | 100 | 10 |

Massachusetts heat test.
Massachusetts and Ohio stripping tests.
Cure: RC-2—5 hours @ R.T.  MC-3—5 hours @ 140° F.
In sealed container 0.67% additive in 85–120 penetration asphalt.

TABLE VI

*Combination Ohio and Massachusetts tests*

[24 hours @ 350° F.]

| Additive | Percent Additive | Type of Asphalt | Type of Stone | Percent Initial Coating | Percent Strip 24 Hours |
|---|---|---|---|---|---|
| RD 2323 | 0.5 | MC-3 | Rhyolite | 100 | 1 |
| Additive A | 0.5 | MC-3 | do | 100 | 8 |
| Additive B | 0.5 | MC-3 | do | 100 | 15 |
| RD 2323 | 0.5 | MC-3 | 50% Silica gravel / 50% Limestone | 100 | 2 |
| Additive A | 0.5 | MC-3 | 50% Silica gravel / 50% Limestone | 100 | 20 |
| Additive B | 0.5 | MC-3 | 50% Silica gravel / 50% Limestone | 100 | 20 |

Massachusetts heat test.
Massachusetts and Ohio stripping tests.
Cure: RC-2—5 hours @ R.T.  MC-3—5 hours @ 140° F.
In sealed container 0.5% additive in MC-3.

The following test data indicate the superior performance of RD 2323 under various conditions of test. These data are presented in groups of three to emphasize the effect of test conditions on the additive and competitive material.

Table VII points out the marked superiority of RD 2323 under the most severe heat conditions (450° F. for seven days). Only 4% stripping on rhyolite and 7% on a 50–50 mix of limestone and silica gravel was noted on the modified Oberbach test, whereas the competitive product showed 25% and 35% stripping, respectively.

TABLE VII

*Modified Oberbach test (static immersion)*

[7 days @ 450° F.]

| Additive | Percent Additive | Type of Asphalt | Type of Stone | Percent Initial Coating | Percent Strip 24 Hours |
|---|---|---|---|---|---|
| RD 2323 | 0.75 | RC-2 | Rhyolite | 100 | 4 |
| RD 2323 | 0.75 | RC-2 | 50% Limestone / 50% Silica gravel | 100 | 7 |
| Additive A | 0.75 | RC-2 | Rhyolite | 85 | 25 |
| Do | 0.75 | RC-2 | 50% Limestone / 50% Silica gravel | 80 | 35 |

Tables VIII, IX and X demonstrate the performance of RD 2323 in three different tests at temperatures ranging from no heat to 225° F. The three tests used were: Modified Nicholson test, modified Oberbach test (static immersion), and wet coating test. The details of these tests are shown in the Appendix.

TABLE VIII

[No heat or storage.]

MODIFIED NICHOLSON TEST

| Additive | Percent Additive | Type of Asphalt | Type of Stone | Percent Initial Coating | Percent Strip |
|---|---|---|---|---|---|
| Control | 0 | MC-3 | Rhyolite | 100 | 85 |
| RD 2323 | 0.5 | MC-3 | ----do---- | 100 | 2 |
| Additive A | 0.5 | MC-3 | ----do---- | 100 | 7 |
| Control | 0 | MC-3 | Limestone 50% / Silica gravel 50% | 100 | 50 |
| RD 2323 | 0.5 | MC-3 | Limestone 50% / Silica gravel 50% | 100 | 2 |
| Additive A | 0.5 | MC-3 | Limestone 50% / Silica gravel 50% | 100 | 12 |

MODIFIED OBERBACH TEST (STATIC IMMERSION)

| Additive | Percent Additive | Type of Asphalt | Type of Stone | Percent Initial Coating | Percent Strip 24 Hours |
|---|---|---|---|---|---|
| Control | 0 | MC-3 | Rhyolite | 100 | 90 |
| RD 2323 | 0.5 | MC-3 | ----do---- | 100 | 0 |
| Additive A | 0.5 | MC-3 | ----do---- | 100 | 5 |
| Control | 0 | MC-3 | Limestone 50% / Silica gravel 50% | 100 | 65 |
| RD 2323 | 0.5 | MC-3 | Limestone 50% / Silica gravel 50% | 100 | 1 |
| Additive A | 0.5 | MC-3 | Limestone 50% / Silica gravel 50% | 100 | 15 |

WET COATING TEST

| Additive | Percent Additive | Type of Asphalt | Type of Stone | Percent Initial Coating |
|---|---|---|---|---|
| Control | 0 | MC-3 | Rhyolite | 90 |
| RD 2323 | 0.5 | MC-3 | ----do---- | 100 |
| Additive A | 0.5 | MC-3 | ----do---- | 100 |
| Control | 0 | MC-3 | Limestone 50% / Silica gravel 50% | 80 |
| RD 2323 | 0.5 | MC-3 | Limestone 50% / Silica gravel 50% | 100 |
| Additive A | 0.5 | MC-3 | Limestone 50% / Silica gravel 50% | 100 |

TABLE IX

[Seven days at 225° F.]

MODIFIED NICHOLSON TEST

| Additive | Percent Additive | Type of Asphalt | Type of Stone | Percent Initial Coating | Percent Strip |
|---|---|---|---|---|---|
| Control | 0 | MC-3 | Rhyolite | 100 | 80 |
| RD 2323 | 0.5 | MC-3 | ----do---- | 100 | 3 |
| Additive A | 0.5 | MC-3 | ----do---- | 100 | 20 |
| Control | 0 | MC-3 | Limestone 50% / Silica gravel 50% | 100 | 60 |
| RD 2323 | 0.5 | MC-3 | Limestone 50% / Silica gravel 50% | 100 | 4 |
| Additive A | 0.5 | MC-3 | Limestone 50% / Silica gravel 50% | 100 | 25 |

MODIFIED OBERBACH TEST (STATIC IMMERSION)

| Additive | Percent Additive | Type of Asphalt | Type of Stone | Percent Initial Coating | Percent Strip |
|---|---|---|---|---|---|
| Control | 0 | MC-3 | Rhyolite | 100 | 80 |
| RD 2323 | 0.5 | MC-3 | ----do---- | 100 | 3 |
| Additive A | 0.5 | MC-3 | ----do---- | 100 | 20 |
| Control | 0 | MC-3 | Limestone 50% / Silica gravel 50% | 100 | 80 |
| RD 2323 | 0.5 | MC-3 | Limestone 50% / Silica gravel 50% | 100 | 5 |
| Additive A | 0.5 | MC-3 | Limestone 50% / Silica gravel 50% | 100 | 30 |

WET COATING TEST

| Additive | Percent Additive | Type of Asphalt | Type of Stone | Percent Initial Coating |
|---|---|---|---|---|
| Control | 0 | MC-3 | Rhyolite | 90 |
| RD 2323 | 0.5 | MC-3 | ----do---- | 100 |
| Additive A | 0.5 | MC-3 | ----do---- | 100 |
| Control | 0 | MC-3 | Limestone 50% / Silica gravel 50% | 80 |
| RD 2323 | 0.5 | MC-3 | Limestone 50% / Silica gravel 50% | 100 |
| Additive A | 0.5 | MC-3 | Limestone 50% / Silica gravel 50% | 95 |

TABLE X

[Fourteen days at 225° F.]

MODIFIED NICHOLSON TEST

| Additive | Percent Additive | Type of Asphalt | Type of Stone | Percent Initial Coating | Percent Strip |
|---|---|---|---|---|---|
| Control | 0 | MC-3 | Rhyolite | 100 | 80 |
| RD 2323 | 0.5 | MC-3 | ----do---- | 100 | 3 |
| Additive A | 0.5 | MC-3 | ----do---- | 100 | 30 |
| Control | 0 | MC-3 | Limestone 50% / Silica gravel 50% | 100 | 80 |
| RD 2323 | 0.5 | MC-3 | Limestone 50% / Silica gravel 50% | 100 | 4 |
| Additive A | 0.5 | MC-3 | Limestone 50% / Silica gravel 50% | 100 | 25 |

MODIFIED OBERBACH TEST (STATIC IMMERSION)

| Additive | Percent Additive | Type of Asphalt | Type of Stone | Percent Initial Coating | Percent Strip |
|---|---|---|---|---|---|
| Control | 0 | MC-3 | Rhyolite | 100 | 80 |
| RD 2323 | 0.5 | MC-3 | ----do---- | 100 | 4 |
| Additive A | 0.5 | MC-3 | ----do---- | 100 | 35 |
| Control | 0 | MC-3 | Limestone 50% / Silica gravel 50% | 100 | 50 |
| RD 2323 | 0.5 | MC-3 | Limestone 50% / Silica gravel 50% | 100 | 5 |
| Additive A | 0.5 | MC-3 | Limestone 50% / Silica gravel 50% | 100 | 35 |

WET COATING TEST

| Additive | Percent Additive | Type of Asphalt | Type of Stone | Percent Initial Coating |
|---|---|---|---|---|
| Control | 0 | MC-3 | Rhyolite | 90 |
| RD 2323 | 0.5 | MC-3 | ----do---- | 100 |
| Additive A | 0.5 | MC-3 | ----do---- | 100 |
| Control | 0 | MC-3 | Limestone 50% / Silica gravel 50% | 70 |
| RD 2323 | 0.5 | MC-3 | Limestone 50% / Silica gravel 50% | 100 |
| Additive A | 0.5 | MC-3 | Limestone 50% / Silica gravel 50% | 80 |

Tables XI and XII demonstrate the performance of RD 2316 and RD 2317 with rhyolite and limestone, respectively, using no heat test and after 24 hours at 350° F. employing the States of Ohio and Massachusetts stripping tests.

TABLE XI

[No heat test.]

| Additive | Percent Additive | Type of Asphalt | Type of Stone | Percent Initial Coating | Percent Strip 24 Hours |
|---|---|---|---|---|---|
| RD 2316 | 0.5 | MC-3 | Rhyolite | 100 | 0 |
| RD 2316 | 0.5 | RC-2 | ----do---- | 100 | 0 |
| RD 2317 | 0.5 | MC-3 | Limestone | 100 | 1 |
| RD 2317 | 0.5 | RC-2 | ----do---- | 100 | 1 |

Based on States of Massachusetts and Ohio stripping tests.
Cure: RC-2—coated stone—5 hours @ room temperature. MC-3—coated stone—5 hours @ 140° F.
Above cures give maximum compression strengths.
In sealed container 0.67% additive in 85-120 penetration asphalt—RC-2.
In sealed container 0.50% additive in MC-3.

TABLE XII

[24 hours @ 350° F. Heat test.]

| Additive | Percent Additive | Type of Asphalt | Type of Stone | Percent Initial Coating | Percent Strip 24 Hours |
|---|---|---|---|---|---|
| RD 2316 | 0.5 | MC-3 | Rhyolite | 100 | 0 |
| RD 2316 | 0.5 | RC-2 | ___do___ | 100 | 0 |
| RD 2317 | 0.5 | MC-3 | Limestone | 100 | 1 |
| RD 2317 | 0.5 | RC-2 | ___do___ | 100 | 2 |

Based on Massachusetts heat test and combined States of Ohio and Massachusetts stripping tests.
Cure: RC-2—5 hours @ room temperature, MC-3—5 hours @ 140° F. Above cures give maximum compression strengths.
In sealed container 0.67% additive in 85-120 penetration asphalt—RC-2.
In sealed container 0.50% additive in MC-3.

Table XIII illustrates the performance of an additive prepared by mixing together one mol of diamine of the formula

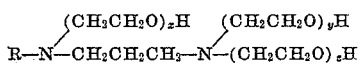

wherein R is a mixture of aliphatic hydrocarbon radicals as contained in tallow fatty acids and the sum of $x+y+z=10$, and 1.5 mols of Neo-Fat 42–06. The Massachusetts heat and stripping tests were employed.

TABLE XIII

| Percent Additive | Type of Asphalt | Type of Aggregate | Percent Coated | Percent Strip 24 Hours |
|---|---|---|---|---|
| 0.5 | RC-2 | 50% Limestone / 50% Silica Gravel | 100 | 1 |

While this invention has been described and exemplified in terms of its preferred embodiments, those skilled in the art will appreciate that modifications can be made without departing from the spirit and scope of the invention.

APPENDIX

Test procedure (State of Massachusetts, Department of Public Works, March 1955)

STATE HIGHWAY ANTI-STRIPPING TEST (1) Heat stability test:
  A. The additives shall be blended into 85–120 penetration asphalt at a temperature of 200–250° F. The resultant blend shall be poured into a round half-pint paint can with a tight seal friction top cover.
  B. Prepare a control sample of untreated asphalt cement in the same manner as above.
  C. Place the covers on the half-pint cans so that they are tightly sealed and place each inside of a one-quart round friction top paint can.
  D. Punch a hole in the covers of the quart cans to act as an air vent and place cover securely on the quart containers.
  E. Place the double container arrangement into an oven maintained at 350° F. for 24 hours. Remove and cool to approximately 200° F.
  F. Prepare RC–2 cutback by diluting 75 parts of each sample with 25 parts of varnish makers' and painters' naphtha. Blend until a homogeneous mixture is obtained.

(2) Materials:
  A. Aggregate—rhyolite stone-washed with distilled water and dried in an oven at 270–300° F.
  B. Distilled water 6.0–7.0 pH.

(3) Stripping test:
  A. Weigh 100 grams of dry aggregate into an 8 gram tin container. Add 2 grams of distilled water and mix until all the aggregate is thoroughly wet.
  B. Add 6 grams of the prepared RC–2 cut-back and mix thoroughly for five minutes. Visually inspect mixture to rate the ability of the prepared cut-back to coat wet aggregate.
  C. Air cure coated aggregate for one hour at room temperature.
  D. Immerse aggregate in distilled water for 24 hours at room temperature.
  E. Visually inspect mixture while still immersed to determine percent of aggregate coated.
  F. Treated bitumen shall be required to coat wet aggregate and to retain at least 90% of the coating after 24 hours static immersion.

STATE OF OHIO—STRIPPING DATA—
SUPPLEMENTAL SPECIFICATION #-105.3
[Medium curing asphalts.]

The medium curing liquid asphalts shall completely coat at least 95% of the aggregate after being subjected to the following stripping test:

(1) Standard reference aggregate composed of 50% silica gravel and 50% crushed limestone, graded to pass a ⅜" sieve and retained on a ¼" sieve, shall be washed until dust free and dried.
(2) 100 grams of the aggregate shall be covered with distilled water and soaked at room temperature for ½ hour. After soaking, the water is to be drained off and the excess shaken off vigorously.
(3) The MC–3 additive treated asphalt shall be heated to 150° F. and shall be added and mixed vigorously with the aggregate for five minutes, making sure that each aggregate particle is completely coated, if possible.
(4) After coating, the mixture shall be spread thinly on a glass plate and cured for one hour at room temperature.
(5) The mixture shall be placed in distilled water at room temperature for one hour, after which time the mixture shall be examined and percent stripping visually estimated.

Prior to the stripping tests—State of Ohio requires the asphalt additive mixture to be able to withstand heating for normal storage periods at temperatures specified for the various asphalts in their "Item M–5— Table of Temperatures." The asphalt-additive mixture should at least be stable for a 4–6 hour period at temperatures exceeding 300° F.

MODIFIED NICHOLSON TEST (1) Either an RC, MC, or SC grade cutback may be used.
(2) Aggregates to be coated shall be Massachusetts rhyolite and/or Ohio reference aggregate. Both shall be grade between ⅜" and ¼" mesh, washed with distilled water and dried in an oven at 250° F. for 24 hours.
(3) Fifty grams of aggregate shall be mixed with 2.5 grams of additive treated liquid asphalt previously heated to an application temperature proper for the material being used. This mixture shall be mixed until complete coating is obtained (not exceeding five minutes).
(4) The coated aggregate is then cured for a period of time appropriate for the material being used, e.g.: RC-grade—room temperature for 16–18 hours; MC-grade—140° F. for 16–18 hours; SC-grade—(same as MC).
(5) After curing, the mixture is remixed and placed in an 8 ounce bottle or jar and covered with 150–175 cc. of distilled water previously heated to 140° F. The bottle or jar is then tightly stoppered or capped and is placed in an apparatus which can turn the container end-over-end in a 110° F. to 130° F. water bath for 15 minutes and at 50–70 r.p.m.
(6) The stone remaining coated shall be visually estimated with the aid of an incandescent or infra-red lamp (100 watt or over).

(7) Manual agitation of the water covered coated stone is permissible provided that constant manipulation can be maintained for the prescribed length of time, at constant temperature and at the prescribed r.p.m.

MODIFIED OBERBACH TEST
(STATIC WATER IMMERSION)

(1) (Same as #1—Modified Nicholson Test.)
(2) (Same as #2—Modified Nicholson Test.)
(3) (Same as #3—Modified Nicholson Test.)
(4) The coated aggregate is then cured as follows: RC-grade—room temperature for two hours; MC-grade—room temperature for five hours; SC-grade—140° F. for 16–18 hours.
(5) After curing, the curd mixture shall be remixed and placed in a 250 ml. beaker. 100 cc. of distilled water at room temperature is then added. After 16–18 hours immersion, a visual estimation of the area of stone remaining coated shall be made with the aid of an incandescent or infra-red lamp (100 watt or over).

WET COATING TEST (1) (Same as Modified Nicholson Test.)
(2) (Same as Modified Nicholson Test.)
(3) Fifty grams of aggregate shall be weighed into a 250 ml. beaker and one gram of water shall be mixed into the stone until entirely wetted.
(4) 2.5 grams of the treated asphalt, at proper application temperature, shall be mixed with the wet aggregate for five minutes. A visual estimation of the area of stone that is coated shall be made with the aid of an incandescent or infra-red lamp (100 watt or over).

The Modified Nicholson and Oberbach Tests and the Wet Coating Test were repeated after 7 and 14 days—225° F. storage periods.

We claim:

1. A strip-resistant bituminous composition comprising a bitumen and about 0.05 to 2.5 weight percent of an amine salt formed by mixing together more than 1 and no greater than 2 molar equivalents of an organic hydrocarbon monocarboxylic acid having from 8 to 22 carbon atoms and one molar equivalent of a diamine having the general formula

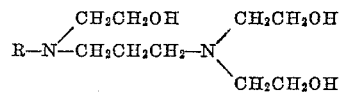

wherein R is an aliphatic hydrocarbon radical having from 8 to 22 carbon atoms and x, y, and z are integers the sum of which is from 2 to 10.

2. A strip-resistant bituminous composition according to claim 1 wherein the bitumen is an asphalt and containing between 0.2 and 0.85 weight percent of the amine salt additive.

3. A strip-resistant bituminous composition comprising an asphalt and between about 0.05 and 2.5 weight percent of an amine salt formed by mixing together between 1 and 2 molar equivalents of an organic hydrocarbon monocarboxylic acid having from 8 to 22 carbon atoms and one molar equivalent of a diamine having the formula

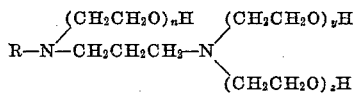

wherein R is an aliphatic hydrocarbon radical having from 8 to 22 carbon atoms.

4. A strip-resistant bituminous composition for application to mineral surfaces of both acid and alkaline nature comprising an asphalt and about 0.05 to about 2.5 weight percent of an amine salt formed by mixing together between 1.3 and 1.6 molar equivalents of an organic hydrocarbon monocarboxylic acid having from 8 to 22 carbon atoms with 1 molar equivalent of N-tallow-N,N',N'-tris(hydroxyethyl)-trimethylene diamine.

5. A strip-resistant bituminous composition for application to mineral surfaces of both acid and alkaline nature comprising an asphalt and about 0.2 to 0.85 weight percent of an amine salt formed by mixing together between 1.3 and 1.6 molar equivalents of a mixture of tall oil acids and one molar equivalent of a diamine having the formula

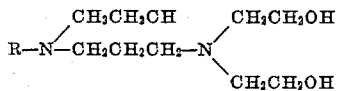

wherein R is an aliphatic hydrocarbon radical having from 8 to 22 carbon atoms.

6. A bituminous composition according to claim 5 wherein R is a mixture of hydrocarbon radicals as contained in tallow.

7. A bituminous composition according to claim 5 wherein R is a mixture of hydrocarbon radicals as contained in coconut oil.

8. A bituminous composition according to claim 5 wherein R is a mixture of hydrocarbon radicals as contained in soybean oil.

9. A strip-resistant bituminous composition for application to a mineral surface having an acid nature comprising an asphalt and about 0.2 to 0.85 weight percent of an amine salt formed by mixing together 1 molar equivalent of a mixture of tall oil acids and 1 molar equivalent of N-tallow-N,N',N'-tris(hydroxyethyl) trimethylenediamine.

10. A strip-resistant bituminous composition for application to a mineral surface having an alkaline nature comprising an asphalt and about 0.2 to 0.85 weight percent of an amine salt formed by mixing together between about 1.7 and 2 molar equivalents of a mixture of tall oil acids with 1 molar equivalent of N-tallow-N,N',N'-tris(hydroxyethyl)trimethylenediamine.

11. A strip-resistant bituminous composition for application to mineral aggregates having both acid and alkaline surfaces comprising an asphalt and about 0.2 to 0.85 weight percent of an amine salt formed by mixing together between about 1.3 to about 1.6 molar equivalents of a mixture of tall oil acids with 1 molar equivalent of N - tallow - N,N',N' - tris(hydroxyethyl)trimethylenediamine.

12. A strip-resistant bituminous composition for application to a rhyolite aggregate comprising an asphalt and about 0.2 to 0.85 weight percent of an amine salt formed by mixing together 1 molar equivalent of a mixture of tall oil acids and 1 equivalent of N-tallow-N,N',N'-tris-(hydroxyethyl)trimethylenediamine.

13. A strip-resistant bituminous composition for application to a limestone aggregate comprising an asphalt and about 0.2 to 0.85 weight percent of an amine salt formed by mixing together between about 1.7 to 2 molar equivalents of a mixture of tall oil acids and 1 molar equivalent of N - tallow - N,N',N' - tris(hydroxyethyl)trimethylenediamine.

14. A process for preventing the stripping of a bituminous composition from the mineral surface to which it has been applied comprising the steps of mixing together more than 1 and no greater than 2 molar equivalents of an organic hydrocarbon monocarboxylic acid having between 8 and 22 carbon atoms with 1 molar equivalent of a diamine having the general formula

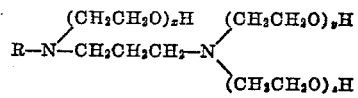

wherein R is an aliphatic hydrocarbon radical having from 8 to 22 carbon atoms and $x$, $y$, and $z$ are integers the sum of which is from 2 to 10, to form an amine salt, and incorporating the amine salt thus formed into said bituminous composition to form a coating material having about 0.05 to 2.5 weight percent of the amine salt, based upon the coating bitumen.

References Cited in the file of this patent

UNITED STATES PATENTS

| | | |
|---|---|---|
| 2,540,678 | Kelley | Feb. 3, 1951 |
| 2,759,839 | Crews et al. | Aug. 21, 1956 |

FOREIGN PATENTS

| | | |
|---|---|---|
| 1,007,203 | France | May 5, 1952 |